(12) United States Patent
Ohara

(10) Patent No.: US 10,978,761 B2
(45) Date of Patent: Apr. 13, 2021

(54) SPRING CONTACT TYPE BATTERY HOLDER AND MEASURING INSTRUMENT

(71) Applicant: YOKOGAWA ELECTRIC CORPORATION, Tokyo (JP)

(72) Inventor: Yuta Ohara, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 68 days.

(21) Appl. No.: 16/297,378

(22) Filed: Mar. 8, 2019

(65) Prior Publication Data
US 2019/0305264 A1    Oct. 3, 2019

(30) Foreign Application Priority Data

Mar. 28, 2018 (JP) .............................. JP2018-061683

(51) Int. Cl.
*H01M 2/10* (2006.01)
*H01M 50/213* (2021.01)
*G01D 11/24* (2006.01)

(52) U.S. Cl.
CPC ........ *H01M 50/213* (2021.01); *G01D 11/245* (2013.01); *H01M 2220/30* (2013.01)

(58) Field of Classification Search
CPC .. H01M 2/105; H01M 2/1055; H01M 2/1061; H01M 2/1066; H01M 2/1016; H01M 2/1022; H01M 2220/30; H01M 2220/20; G01D 11/24; G01D 11/245; G01D 11/18; G01D 11/16
See application file for complete search history.

(56) References Cited

FOREIGN PATENT DOCUMENTS

| JP | 56-140146 | * 10/1981 | ............... G06F 1/26 |
| JP | S56-140146 U | 10/1981 | |
| JP | S57-090337 U | 6/1982 | |
| JP | 2015-206714 A | 11/2015 | |

* cited by examiner

*Primary Examiner* — Raymond Alejandro
(74) *Attorney, Agent, or Firm* — Osha Bergman Watanabe & Burton LLP

(57) ABSTRACT

A spring contact type battery holder includes a plurality of batteries having a positive electrode and a negative electrode on a same straight line. At least two batteries among the plurality of batteries are connected in parallel with each other in a state where same electrodes face each other on the same straight line.

15 Claims, 6 Drawing Sheets

SPRING CONTACT TYPE BATTERY HOLDER AND MEASURING INSTRUMENT

CROSS-REFERENCE TO RELATED APPLICATIONS

The present application claims priority under 35 U.S.C. § 119 to Japanese Patent Application No. 2018-061683, filed on Mar. 28, 2018. The contents of which are incorporated herein by reference.

BACKGROUND

Technical Fields

The present invention relates to a spring contact type battery holder and a measuring instrument.

Related Art

A measuring instrument operated by batteries is disclosed in Japanese Unexamined Patent Application Publication No. 2015/206714. The measuring instrument has a sensor and a controller. The sensor detects a physical quantity of a measuring target, and outputs a signal corresponding to the physical quantity. The controller includes a connection port, and can measure a different type of physical quantity when a type of the sensor connected to the connection port is switched. The controller has built-in batteries acting as a power supply source. Further, the controller is started by power supplied from the batteries, and is configured to supply part of the supplied power to the sensor whose connector is inserted into the connection port.

As illustrated in FIG. 5(C) of Patent Document 1, the measuring instrument of the related art houses a plurality of batteries (three batteries) on a back side thereof in the same direction. These batteries are usually made to come into contact with an elastically deformable spring contact such as a leaf spring to prevent a contact fault.

Meanwhile, when vibration or a shock is applied to this measuring instrument from the outside, all the batteries are directed in the same direction. Thus, depending on a direction in which acceleration is applied, the spring contact may be contracted due to an inertial force of the acceleration, and all the batteries may be instantaneously separated from the contact. Since no power can be supplied to the sensor while the batteries are separated from the contact, data is unlikely to be collected.

Recently, natural disasters such as an epicentral earthquake have occurred frequently. A measuring instrument capable of continuously collecting data even during a disaster where such unexpected vibration or acceleration is applied is required.

SUMMARY

One or more embodiments of the present invention provide a spring contact type battery holder which includes a plurality of batteries having a positive electrode and a negative electrode on a same straight line, wherein at least two batteries among the plurality of batteries are connected in parallel with each other in a state where same electrodes face each other on the same straight line.

Further one or more embodiments of the present invention will become apparent from the following detailed description of exemplary embodiments with reference to the attached drawings.

DETAILED DESCRIPTION

Embodiments of the present invention will be now described herein with reference to illustrative embodiments. Those skilled in the art will recognize that many alternative embodiments can be accomplished using one or more embodiments of the present invention and that the present invention is not limited to the embodiments illustrated herein for explanatory purposes.

One or more embodiments of the present invention provide a spring contact type battery holder and a measuring instrument capable of inhibiting contact faults of batteries from occurring due to an influence of vibration or a shock from the outside.

Hereinafter, one or more embodiments of the present invention will be described with reference to the drawings.

Figure 1:
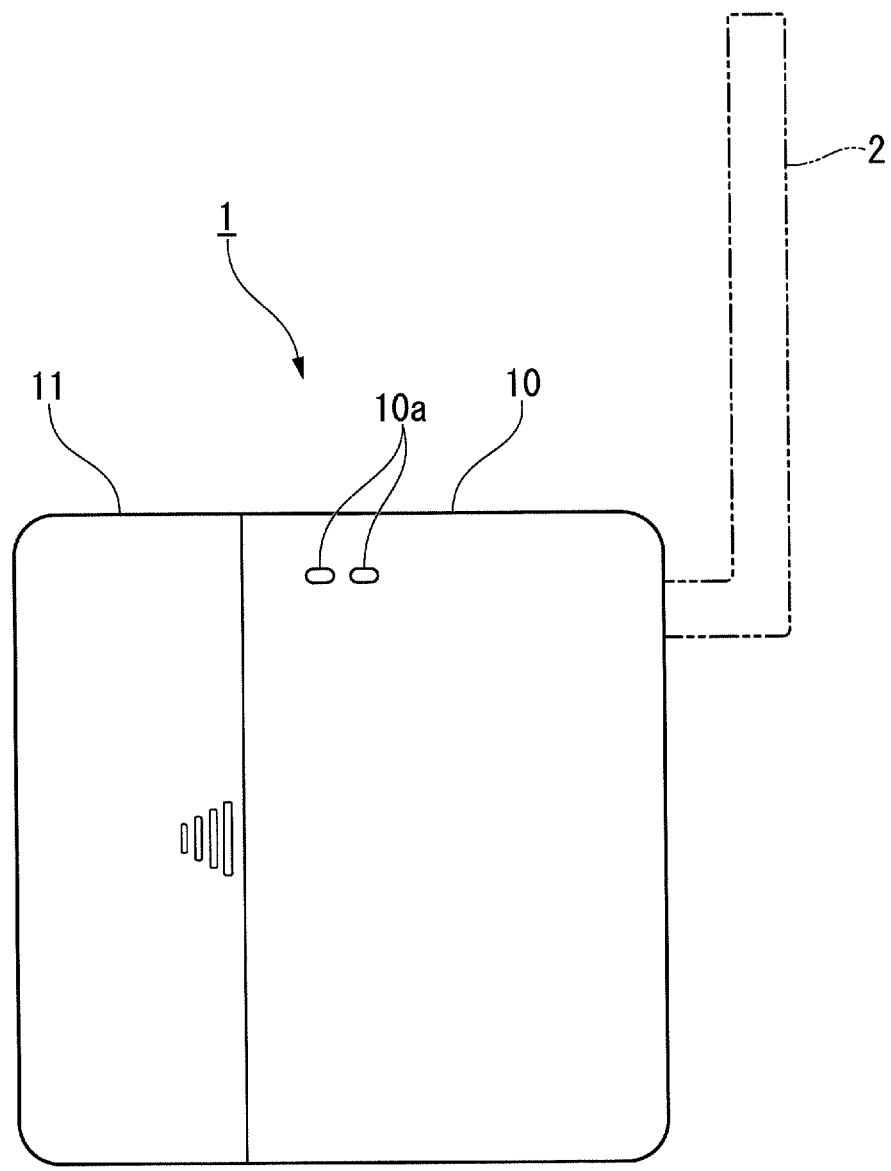
FIG. 1 is an appearance diagram illustrating a measuring instrument according to one or more embodiments.

FIG. 1 is an appearance diagram illustrating a measuring instrument 1 according to one or more embodiments.

The measuring instrument 1 is for measuring a prescribed physical quantity, is installed, for example, in a warehouse, and measures a temperature, a humidity, etc. in the warehouse. The measuring instrument 1 includes a rectangular box-shaped casing 10. A radio antenna 2 is made to be connectable to the casing 10. The measuring instrument 1 performs wireless communication with an external communication device (not shown) via the radio antenna 2, and can transmit measured data or the like.

Figure 2:
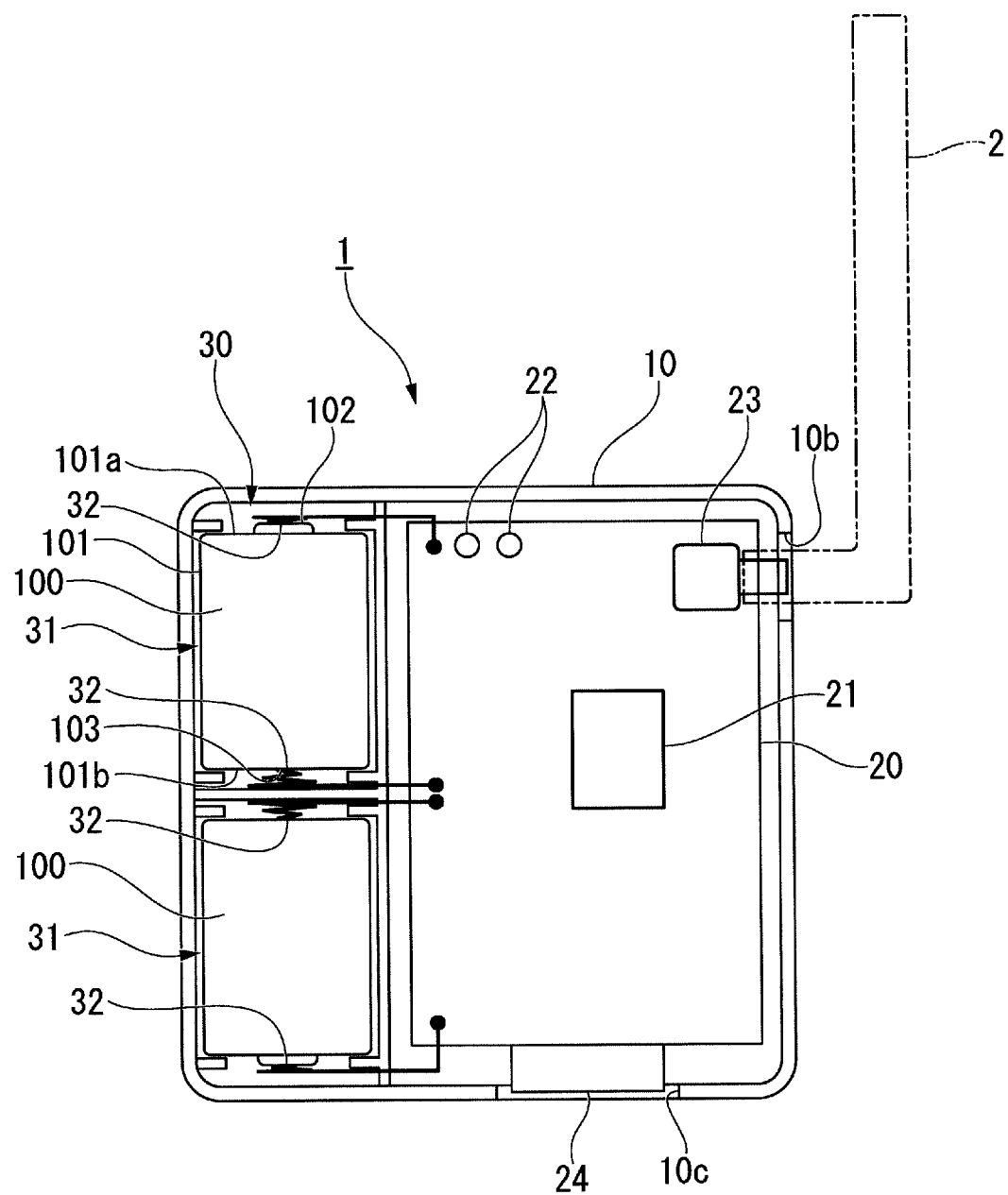
FIG. 2 is an internal constitution diagram illustrating the measuring instrument according to one more embodiments.

A plurality of lighting windows 10a that are lit up at the time of ON/OFF of a power supply or during data transmission are provided in the casing 10. Further, a battery cover 11 is mounted on the casing 10 in a demountable way. When the battery cover 11 is demounted, a battery holder (a spring contact type battery holder) 30 illustrated in FIG. 2 is exposed. The measuring instrument 1 is made to be operated (started) by batteries 100 housed in the battery holder 30.

FIG. 2 is an internal constitution diagram illustrating the measuring instrument 1 according to one or more embodiments.

The measuring instrument 1 houses a substrate 20 in the casing 10. A sensor 21 for measuring a prescribed physical quantity, an illumination element 22 such as an LED, an antenna connector 23 to which the radio antenna 2 is connected, and a connector 24 on which an external sensor or the like can be mounted are provided on the substrate 20. An opening 10b that exposes the antenna connector 23 to the outside and an opening 10c that exposes the connector 24 to the outside are formed in the casing 10.

The sensor 21 is, for example, a humidity sensor. For example, a temperature sensor is connected to the connector 24 as an external sensor. Measured data measured by the sensor 21 and the external sensor is stored in a logger (not shown) provided on the substrate 20, and can be transmitted from the measuring instrument 1 by wireless communication via the radio antenna 2. The data stored in the logger is made to be able to be acquired by wired connection to the measuring instrument 1.

The battery holder 30 includes a plurality of battery housings 31 (two battery housings in one or more embodiments) that house the plurality of batteries 100 (the two batteries in one or more embodiments). Each of the batteries 100 is a cylindrical battery, and includes a cylindrical main body 101, a positive electrode 102 that is disposed on one side in an axial direction in which a central axis of the main body 101 extends, and a negative electrode 103 that is disposed on the other side.

The positive electrode 102 is formed in a lug shape in which it protrudes from one end face 101a of the main body 101. On the other hand, the negative electrode 103 is formed in a planar shape that is approximately the same as the other end face 101b of the main body 101. The positive electrode 102 and the negative electrode 103 are electrically connected to the substrate 20 via spring contacts 32 provided on each of the battery housings 31.

The two batteries 100 housed in the two battery housings 31 are connected in parallel to the substrate 20 via the spring contacts 32. Power of the two batteries 100 housed in the two battery housings 31 is supplied to the sensor 21 (and constituent apparatuses including the external sensor) via the substrate 20. According to this constitution, even if the supply of the power from any one of the two batteries 100 is stopped, the measuring instrument 1 can be continuously operated if the power from the other connected in parallel is supplied.

Figure 3:
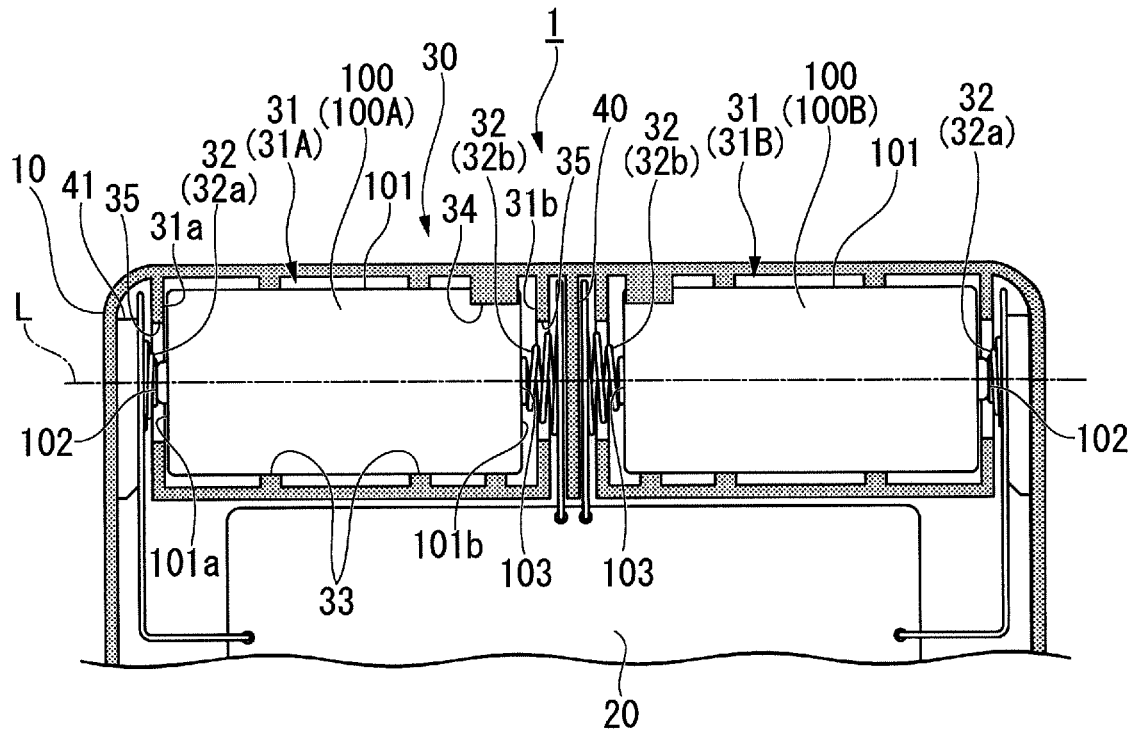
FIG. 3 is an enlarged diagram illustrating a battery holder according to one or more embodiments.
Figure 4:
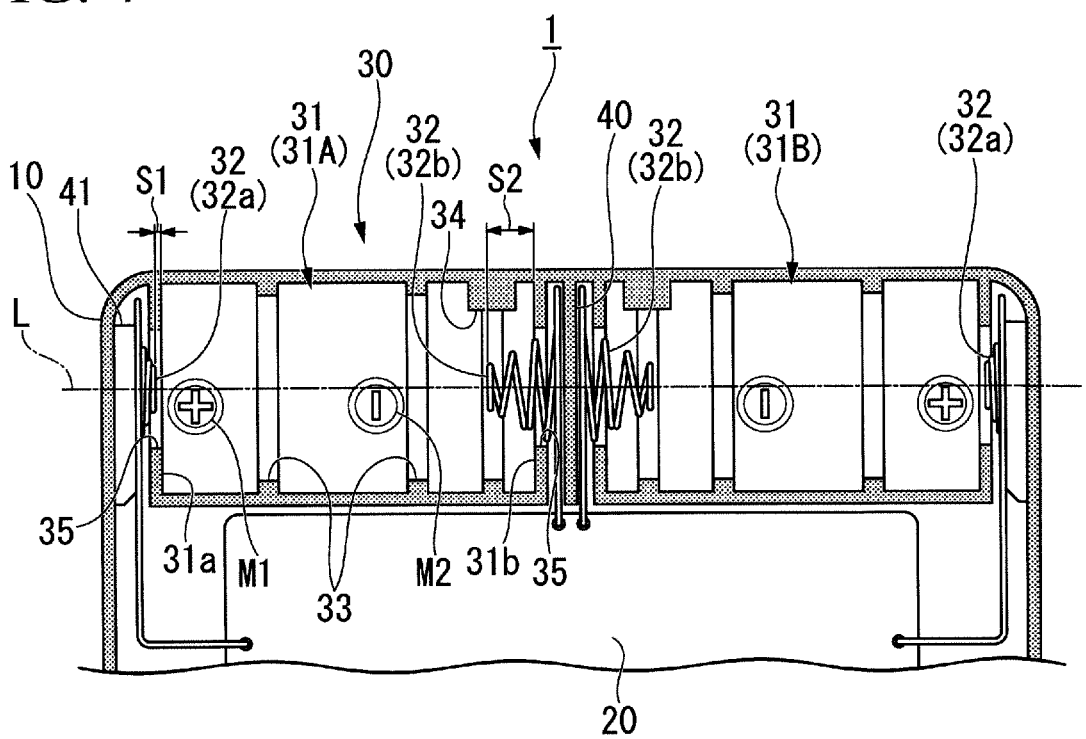
FIG. 4 is an enlarged diagram illustrating a state when batteries are demounted from the battery holder illustrated in FIG. 3.

FIG. 3 is an enlarged diagram illustrating the battery holder 30 according to one or more embodiments. FIG. 4 is an enlarged diagram illustrating a state when the batteries 100 are demounted from the battery holder 30 illustrated in FIG. 3. A reference sign L illustrated in FIGS. 3 and 4 indicates a common axis that passes through the centers of the batteries 100 and the battery housings 31.

Each battery housing 31 includes a plurality of ribs 33 that support an outer circumferential surface of the main body 101 of each battery 100, an escape restricting segment 34 that restricts escape of the main body 101 supported by the plurality of ribs 33, and a pair of walls 35 that can face the end faces 101a and 101b of the main body 101 in an axial direction.

As illustrated in FIG. 4, the plurality of ribs 33 are formed in circular arc shapes. Marks M1 and M2 that indicate an inserting direction of each battery 100 are formed on the bottom of each battery housing 31 exposed between the plurality of ribs 33. A sign "+" indicating the vicinity of the positive electrode 102 is printed on the mark M1. On the other hand, a sign "−" indicating the vicinity of the negative electrode 103 is printed on the mark M2. As illustrated in FIG. 3, the escape restricting segment 34 is provided close to the negative electrode 103 of each battery 100.

The pair of walls 35 are made to be able to face the main body 101 of each battery 100 outside the positive electrode 102 in a radial direction. That is, a gap into which the positive electrode 102 (and a conical portion of each spring contact 32 (to be described below)) can be inserted is formed in one of the pair of walls 35. A first facing surface 31a that faces one end face 101a of the main body 101 in the axial direction and a second facing surface 31b that faces the other end face 101b of the main body 101 in the axial direction are formed on the pair of walls 35.

The spring contacts 32 are disposed outside the pair of walls 35 in the axial direction. A back side of a first spring contact 32a that is one of the spring contacts 32 and is in contact with the positive electrode 102 in the axial direction is supported by a support 41 formed on the casing 10. On the other hand, a back side of a second spring contact 32b that is the other of the spring contacts 32 and is in contact with the negative electrode 103 in the axial direction is supported by a partition wall 40 that partitions the two battery housings 31.

Each of the first spring contact 32a and the second spring contact 32b may be a conical coil spring. As illustrated in FIG. 4, a tip of a conical portion of the first spring contact 32a is disposed outside the first facing surface 31a in the axial direction by a distance S1. Thus, even in a case where each battery 100 is reversely inserted, contact between the negative electrode 103 and the first spring contact 32a can be prevented. The distance S1 is a value that is less than an amount of protrusion of the positive electrode 102 from the end face 101a. On the other hand, a tip of a conical portion of the second spring contact 32b is disposed inside the second facing surface 31b in the axial direction by a distance S2. The distance S2 is a value that is sufficiently greater than each of the distance S1 and the amount of protrusion of the positive electrode 102.

The battery housings 31 having the above constitution hold the partition wall 40 between them, and are provided on the same straight line L in bilateral symmetry. That is, in FIGS. 3 and 4, in a first battery housing 31A disposed on the left side of the surface of the paper with respect to the partition wall 40, the first spring contact 32a is disposed on the left side of the surface of the paper, and the second spring contact 32b is disposed on the right side of the surface of the paper. On the other hand, in a second battery housing 31B disposed on the right side of the surface of the paper with respect to the partition wall 40, the first spring contact 32a is disposed on the right side of the surface of the paper, and the second spring contact 32b is disposed on the left side of the surface of the paper.

According to the battery holder 30 having the above constitution, the two batteries 100, each of which has the positive electrode 102 and the negative electrode 103, can be connected in parallel in a state where the same electrodes (the negative electrodes 103 in one or more embodiments) face each other on the same straight line L. Therefore, even if vibration or a shock is applied to the measuring instrument 1 from the outside and a contact fault occurs at any one of the two batteries 100, the supply of the power from the other can continue.

To be specific, an inertial force directed to the right side of the surface of the paper in FIG. 3 acts on the first battery 100A housed in the first battery housing 31A, and the positive electrode 102 of the first battery 100A stands apart from the first spring contact 32a. In this case, since the second battery 100B housed in the second battery housing 31B is disposed on the same straight line L as the first battery 100A, an inertial force having the same condition (the same direction) as the first battery 100A (an inertial force directed to the right side of the surface of the paper in FIG. 3) acts on the second battery 100B.

Here, since the second battery 100B is housed in the second battery housing 31B in the direction opposite to the first battery 100A, the second battery housing 31B has such a form that, unlike the first battery 100A, the positive electrode 102 of the second battery 100B is pressed against the first spring contact 32a. For this reason, no contact fault occurs in the second battery housing 31B.

Therefore, according to the measuring instrument 1 including the battery holder 30 having the above constitution, since the contact fault of each battery 100 is prevented even if vibration or a shock is applied from the outside, data can be continuously collected by the sensor 21.

Further, in one or more embodiments, the spring contacts 32a and 32b corning into contact with the positive and negative electrodes 102 and 103 of each of the first battery 100A and the second battery 100B are each formed of a conical coil spring. Since the conical coil spring has a long deformable stroke compared to a leaf spring or the like, it can also cope with great vibration or shock, and more reliably prevent a contact fault.

While embodiments of the present invention have been described with reference to the drawings, the present invention is not limited to the above embodiments. All the shapes and combinations of the components shown in the aforementioned embodiments are only examples, and can be variously modified based on design requirements without departing from the spirit and scope of the present invention.

For example, the measuring instrument 1 that needs to be continuously operated as in the above embodiments may prevent an operation from being stopped even during battery replacement. Therefore, a constitution as illustrated in FIG. 5 may be adopted.

Figure 5:
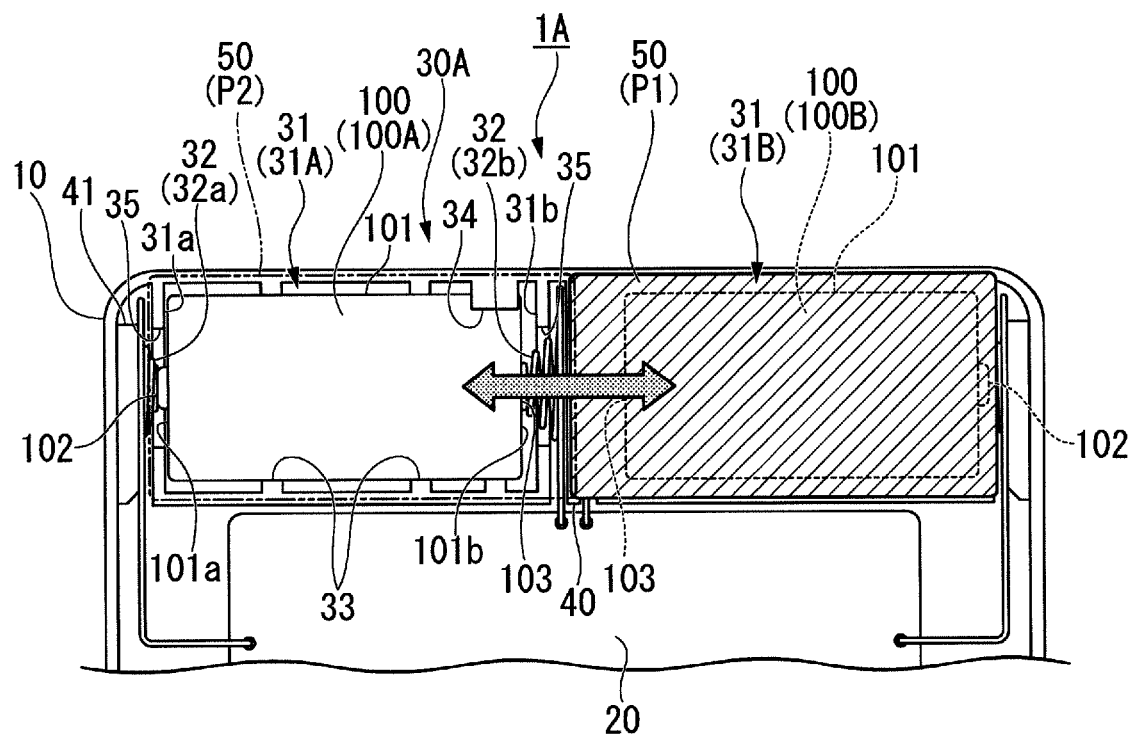
FIG. 5 is an enlarged diagram illustrating a battery holder according to a modification of one or more embodiments.

FIG. 5 is an enlarged diagram illustrating a battery holder 30A according to a modification of one or more embodiments. In the following description, components identical or similar to those of the aforementioned embodiments are given the same reference signs, and description thereof is simplified or omitted.

As illustrated in FIG. 5, a measuring instrument 1A includes a battery holder 30A having a slide cover 50. The slide cover 50 is provided to be slidable between a first position P1 and a second position P2 in an axial direction.

When the slide cover 50 is located at the first position P1, a first battery housing 31A is opened to enable battery replacement, whereas a second battery housing 31B is closed to disable battery replacement. Further, when the slide cover 50 is located at the second position P2, the first battery housing 31A is closed to disable battery replacement, whereas the second battery housing 31B is opened to enable battery replacement.

According to this constitution, when a battery 100 on one side of the first and second battery housings 31A and 31B is replaced, a battery 100 on the other side cannot be demounted by the slide cover 50. Here, since the two batteries 100 are connected in parallel, it is possible to replace the batteries 100 without stopping an operation if the batteries 100 are replaced one by one. Therefore, the measuring instrument 1A can continuously collect data by means of a sensor 21 without stopping an operation even during the battery replacement.

Figure 6A:
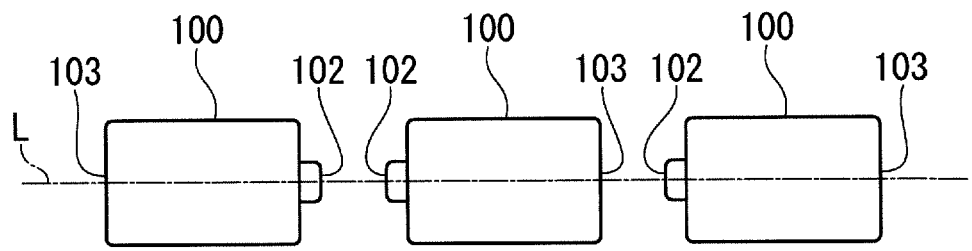
FIG. 6A is a diagram illustrating a modification of an array of the batteries according to one or more embodiments.
Figure 6B:
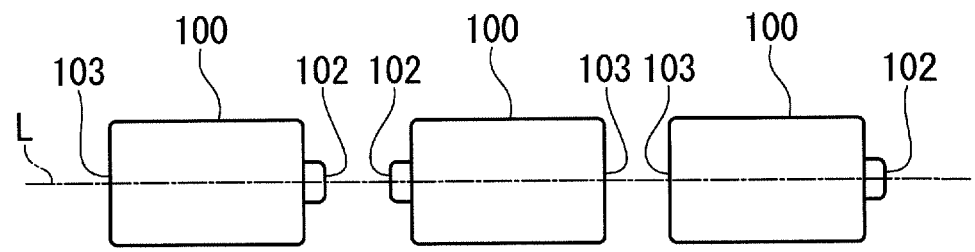
FIG. 6B is a diagram illustrating a modification of an array of the batteries according to one or more embodiments.
Figure 6C:
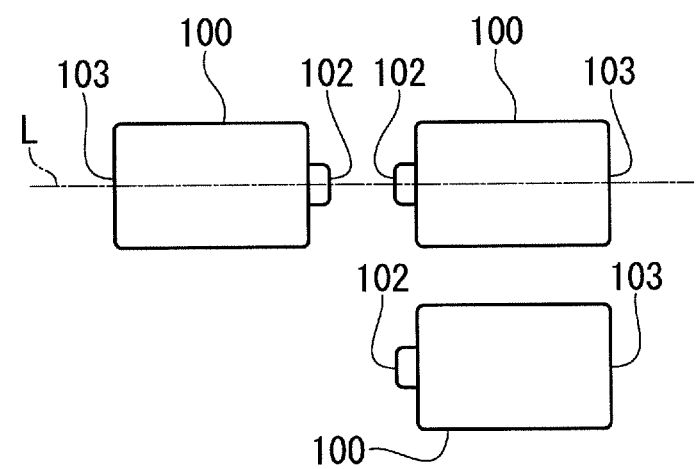
FIG. 6C is a diagram illustrating a modification of an array of the batteries according to one or more embodiments.

For example, in one or more embodiments, the form in which the battery holder 30 houses the two batteries 100 has been described, but a form in which the battery holder 30 houses three or more batteries 100 may be adopted. In this case, all the batteries 100 need not be disposed on the same straight line L, and at least two batteries 100 need only be disposed on the same straight line L as in the above embodiments. For example, the batteries may be disposed as illustrated in FIGS. 6A to 6C.

Figure 7:
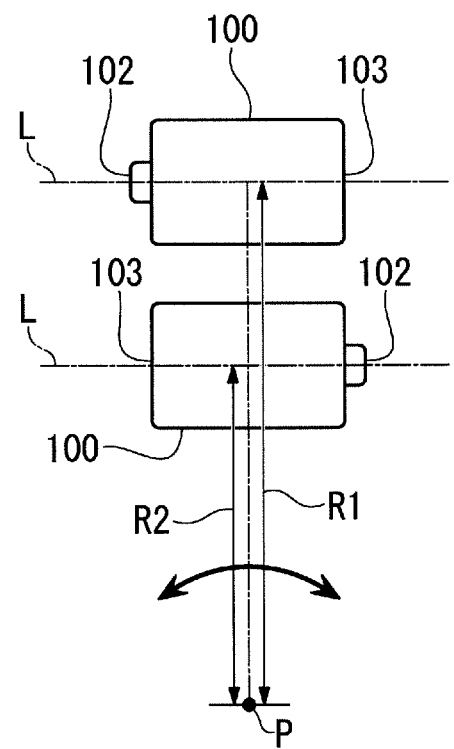
FIG. 7 is a diagram illustrating an array of batteries as a comparative example.

With regard to a constitution that does not have the requirement of "on the same straight line L," that is, batteries 100 whose axes are shifted and which are disposed in directions opposite to each other as illustrated in FIG. 7, an inertial force does not act under the same condition, and thus there is a fear of a contact fault. For example, in a case where the measuring instrument 1 oscillates about a certain point P and oscillation radii of the batteries 100 whose axes are shifted and disposed are R1 and R2 and are different from each other, amplitudes thereof are different from each other, and thus magnitudes of the inertial forces acting on the spring contacts 32 vary. Then, a resonant frequency of elastic deformation in the spring contacts 32 is shifted, and both of the batteries 100 are likely to undergo a contact fault at the same time.

For example, in the above embodiments, the constitution in which the spring contacts 32a and 32b coming into contact with the positive and negative electrodes 102 and 103 of each of the first and second batteries 100A and 100B are each formed of a conical coil spring has been given as an example. However, at least one of the spring contacts 32a and 32b need only be a conical coil spring.

For example, in the above embodiments, the cylindrical batteries acting as the batteries 100 haven been given as an example. However, embodiments of the present invention can also be applied to batteries such as button type batteries, coin type batteries, and so on as long as they are "batteries having the positive and negative electrodes on the same straight line."

For example, although the case where the spring contact type battery holder of embodiments of the present invention is applied to the measuring instrument has been given as an example in the above embodiments, it goes without saying that the embodiments of present invention can be applied to all devices operated by batteries.

As described above, the spring contact type battery holder of one or more embodiments includes a plurality of batteries having a positive electrode and a negative electrode on a same straight line, and at least two batteries among the plurality of batteries are connected in parallel with each other in a state where same electrodes face each other on the same straight line.

According to this constitution, even if vibration or a shock is applied from the outside and a contact fault occurs at any one of the two batteries, an acceleration having the same condition (the same direction) as the one battery is applied to the other battery disposed on the same straight line as the one battery. Here, since the other battery has a relationship in which electrodes thereof are opposite to those of the one battery subjected to the contact fault, the other battery has such a form that the electrode thereof is reversely pressed against a contact by the acceleration, and no contact fault occurs. Therefore, even if the contact fault occurs in the one battery, supply of power from the other battery can continue.

Further, in one or more embodiments, at least one of spring contacts coming into contact with the positive electrode and the negative electrode of each of the two batteries is a conical coil spring.

Since the conical coil spring has a longer deformable stroke than a leaf spring or the like, it can also follow great vibration or shock, and more reliably prevent a contact fault.

Further, in one or more embodiments, the spring contact type battery holder further includes two battery housings that house the two batteries, and a slide cover that is slidable between the two battery housings, opens any one of the two battery housings to enable battery replacement, and closes the other battery housing to disable battery replacement.

According to this constitution, when any one of the two batteries is replaced, the other battery cannot be demounted due to the slide cover, and thus can continue the supply of power even when the one battery is replaced.

Further, in one or more embodiments, a measuring instrument includes a sensor that measures a prescribed physical quantity, and the spring contact type battery holder described above, that houses batteries and supplies power to the sensor.

According to this constitution, even if vibration or a shock is applied from the outside, a contact fault of the battery is prevented. Thus, data can be continuously collected by the sensor.

As used herein, the following directional terms "front, back, above, downward, right, left, vertical, horizontal, below, transverse, row and column" as well as any other similar directional terms refer to those instructions of a device equipped with embodiments of the present invention. Accordingly, these terms, as utilized to describe embodiments of the present invention should be interpreted relative to a device equipped with embodiments of the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A battery holder comprising:
    a plurality of batteries each having a positive electrode and a negative electrode on a same straight line, wherein
    at least two batteries among the plurality of the batteries are connected in parallel with each other in a state where electrodes of the same polarity of the at least two batteries face each other on the same straight line,
    the battery holder further comprises:
        a first spring contact that contacts with the positive electrode;
        a second spring contact disposed along the same straight line as the first spring contact and contacts with the negative electrode;
        a first wall having a first facing surface that faces a main body of one of the at least two batteries on a side of the positive electrode; and
        a second wall having a second facing surface that faces the main body of the one of the at least two batteries on a side of the negative electrode,
    each of the first spring contact and the second spring contact is a conical coil spring, and
    a tip of a conical portion of the first spring contact is disposed outside from the first facing surface by a first distance on the same straight line.

2. The battery holder according to claim 1, further comprising:
    two battery housings that house the two batteries; and
    a slide cover that is slidable between the two battery housings, opens any one of the two battery housings to enable battery replacement, and closes the other battery housing to disable battery replacement.

3. The battery holder according to claim 1, wherein the first distance is less than a distance of protrusion of the positive electrode.

4. A measuring instrument comprising:
    a sensor that measures a prescribed physical quantity; and
    the battery holder according to claim 1, that houses batteries and supplies power to the sensor.

5. The measuring instrument according to claim 4, wherein at least one of spring contacts coming into contact with the positive electrode and the negative electrode of each of the two batteries is a conical coil spring.

6. The measuring instrument according to claim 4, further comprising:
    two battery housings that house the two batteries; and
    a slide cover that is slidable between the two battery housings, opens any one of the two battery housings to enable battery replacement, and closes the other battery housing to disable battery replacement.

7. The measuring instrument according to claim 4, further comprising:
    a first spring contact that is in contact with the positive electrode; and
    a second spring contact that is disposed on the same straight line as the first spring contact, and is in contact with the negative electrode.

8. The measuring instrument according to claim 7, further comprising:
    a first wall that has a first facing surface that faces a main body of one of the two batteries on a side of the positive electrode; and
    a second wall that has a second facing surface that faces a main body of the one of the two batteries on a side of the negative electrode.

9. The measuring instrument according to claim 8, wherein each of the first spring contact and the second spring contact is a conical coil spring.

10. The measuring instrument according to claim 9, wherein a tip of a conical portion of the first spring contact is disposed outside the first facing surface in a direction of the same straight line by a first distance.

11. The measuring instrument according to claim 10, wherein the first distance is a value that is less than an amount of protrusion of the positive electrode.

12. The measuring instrument according to claim 9, wherein a tip of a conical portion of the second spring contact is disposed inside the second facing surface in a direction of the same straight line by a second distance.

13. The measuring instrument according to claim 12, wherein the second distance is a value that is greater than each of the first distance and an amount of protrusion of the positive electrode.

14. A battery holder comprising:
    a plurality of batteries each having a positive electrode and a negative electrode on a same straight line, wherein
    at least two batteries among the plurality of the batteries are connected in parallel with each other in a state where electrodes of the same polarity of the at least two batteries face each other on the same straight line, the battery holder further comprises:
- a first spring contact that contacts with the positive electrode;
- a second spring contact disposed along the same straight line as the first spring contact and contacts with the negative electrode;
- a first wall having a first facing surface that faces a main body of one of the at least two batteries on a side of the positive electrode; and
- a second wall having a second facing surface that faces the main body of the one of the at least two batteries on a side of the negative electrode, each of the first spring contact and the second spring contact is a conical coil spring, and a tip of a conical portion of the second spring contact is disposed inside from the second facing surface by a second distance on the same straight line.

15. The battery holder according to claim 14, wherein the second distance is greater than each of the first distance and a distance of protrusion of the positive electrode.

\* \* \* \* \*